S. HOOBLER.
Tire-Bending Machines.

No. 148,122.  Patented March 3, 1874.

WITNESSES:  
Chas. Nida  
O. Sedgwick

INVENTOR:  
S. Hoobler  
BY Munn & Co.  
ATTORNEYS.

UNITED STATES PATENT OFFICE.

SAMUEL HOOBLER, OF MINERSVILLE, MISSOURI.

IMPROVEMENT IN TIRE-BENDING MACHINES.

Specification forming part of Letters Patent No. 148,122, dated March 3, 1874; application filed January 5, 1874.

*To all whom it may concern:*

Figure 1:
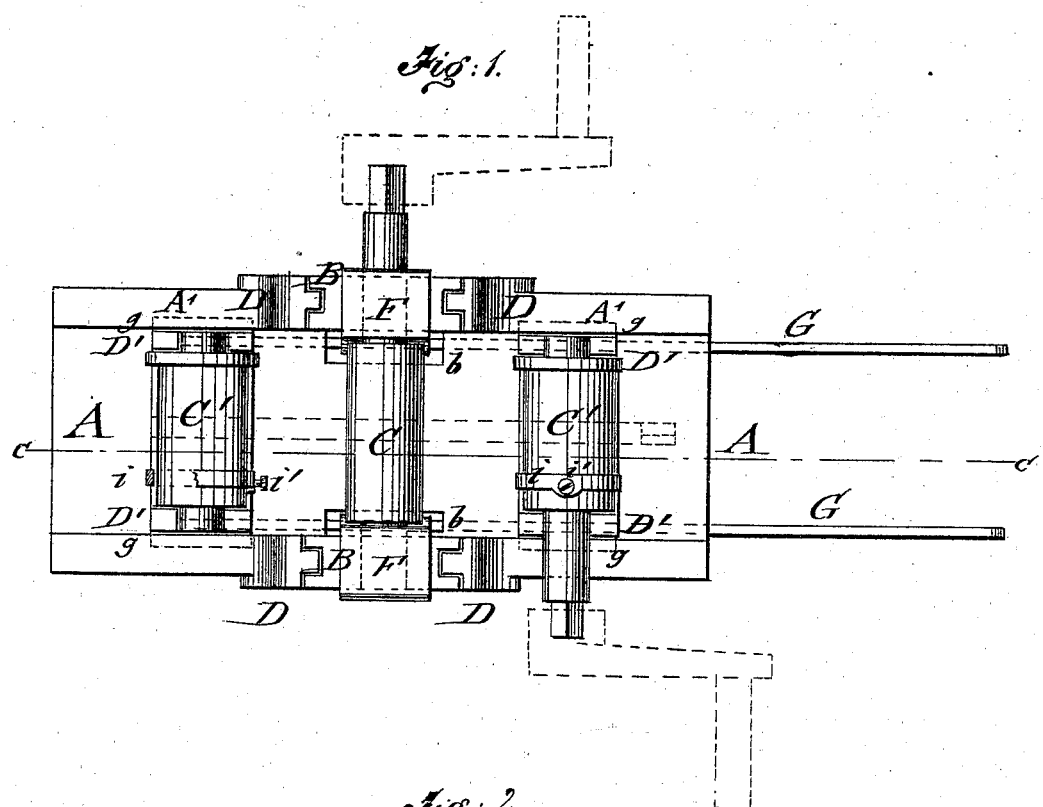
Figure 2:
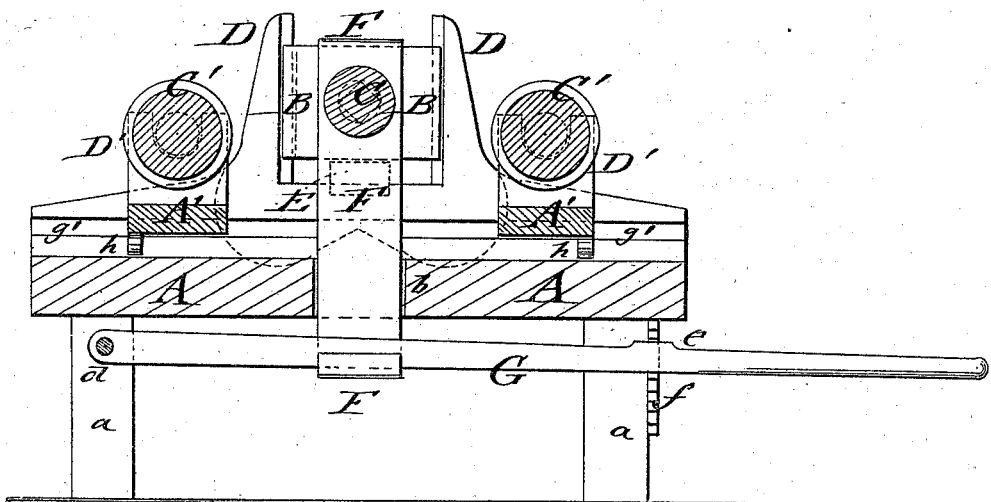

Be it known that I, SAMUEL HOOBLER, of Minersville, in the county of Jasper and State of Missouri, have invented a new and Improved Machine for Bending Tires, of which the following is a specification:

In the accompanying drawing, Figure 1 represents a plan view, and Fig. 2 a vertical longitudinal section, of my improved machine for bending tires, on the line $c\ c$, Fig. 1.

Similar letters of reference indicate corresponding parts.

The object of my invention is to furnish, for blacksmiths, wagon-manufacturers, and others, an improved machine for bending tires, by which tires of various degrees of thickness may be accurately bent without side twist, and easily detached from the rollers, which are also quickly and nicely set to the required degree of bending. My invention consists of a central roller, placed in movable spring-bearings, which are applied by strong stirrups and levers, and made detachable from the supporting-frame.

In the drawing, A represents the main frame, of suitable strength and material. It is of longitudinal shape, and supported on strong legs $a$. The bearings B of central roller C slide in vertical standards or guide-pieces D, and rest on suitable rubber or metal springs E. Strong stirrups F are applied over the top of bearings B, pass along the inside of the same through slots $b$ of frame A, and carry in their hook-shaped ends the powerful levers G, which are pivoted to a cross-rod, $d$, of legs $a$ at one end of frame A, and may be locked, by means of projecting lugs $e$, into racks $f$ of the opposite legs $a$. The forward-extending handle-ends of levers G serve to give the leverage required for setting roller C. By detaching the levers G from the stirrup-ends, the bearings B and stirrups F may be raised above standards D, and the bent tire be detached from the central roller C. The side rollers C′ turn in standards D′ of roller-frames A′, which are placed laterally into frame A, and guided by projecting side rails $g$ in grooves $g'$ of the same. A central downward-projecting lug, $h$, of each roller-frame A serves for the passage of a screw with right and left hand thread, (shown in dotted lines in Fig. 1,) by which the side rollers C′ may be adjusted nearer to or farther from each other. Each side roller C′ is provided with an adjustable rim, $i$, and one or more set-screws, $i'$, which are set to the width of the tire, to secure the straight passage of the same through the rollers without side twists or other irregularities.

The tire is placed below the central roller, after one end is bent by hand to the felly, the side rollers are firmly adjusted against it, the rims set to its width, and the tire then passed through the rollers by turning the central roller and one of the side rollers by means of suitable cranks. The ends of the tire will meet, forming a tire which will fit accurately around the wheel to which it is to be applied after being taken out of the bending-machine, in the manner described.

Having thus described my invention, I claim as new and desire to secure by Letters Patent—

1. The improved machine herein described for bending tires, consisting of main frame A with standards D, bearings B, central roller C, springs E, stirrups F, and adjustable levers G, in combination with side rollers C′, guided by frames A′ in grooves $g'$ of the main frame, and applied substantially in the manner and for the purpose described.

2. The stirrup F, adjusted over the top of bearing B, and provided with hook-shaped end, in combination with spring-bearings B E, pivoted lever G, and rack $f$, for setting the central roller to the required position, and for detaching the same after bending the tire, as described.

SAMUEL HOOBLER.

Witnesses:
NATHANIEL HUDSON,
O. T. HAYWARD.